United States Patent [19]

Vernizzi et al.

[11] Patent Number: 4,778,673

[45] Date of Patent: Oct. 18, 1988

[54] ADDITIVE-CONTAINING PAINTS

[75] Inventors: Giorgio Vernizzi, Modena; Peppino Raffaellini, Cavezzo; Lucio Trevisan, Parma; Gastone Benatti, Cavezzo, all of Italy

[73] Assignee: OECE Industrie Chimiche Spa, Cavezzo, Italy

[21] Appl. No.: 809,008

[22] Filed: Dec. 16, 1985

[30] Foreign Application Priority Data

Jan. 3, 1985 [IT] Italy ............................ 19008 A/85

[51] Int. Cl.$^4$ ................... A61K 31/045; A61K 31/52; A61K 31/59; A61K 31/35
[52] U.S. Cl. ..................................... 424/10; 514/826; 514/922; 514/957; 514/958; 514/974
[58] Field of Search ............... 514/974, 958, 957; 424/10, 76.2, 76.21, 76.8; 523/102, 103

[56] References Cited

U.S. PATENT DOCUMENTS 2,103,830 12/1937 Shuger .
4,329,366 5/1982 Nashed et al. ................ 514/626
4,567,172 1/1986 Kamano et al. ............... 514/179

FOREIGN PATENT DOCUMENTS 899782 5/1972 Canada .
0093198 11/1983 European Pat. Off. ......... 523/103
2542002 9/1984 France ............................ 523/102
293434 9/1953 Switzerland .

Primary Examiner—Albert T. Meyers
Assistant Examiner—Raymond J. Henley, III
Attorney, Agent, or Firm—Stevens, Davis, Miller & Mosher

[57] ABSTRACT

There have been prepared paints containing as additives known pharmaceutical products, having such a therapeutic or prophylactic action as to neutralize or prevent the irritating effect of the volatile components of the paints on the respiratory and conjunctival mucosae. The addition is also foreseen of systems of suitably blended and proportional terpenic substances, so as to impart a pleasant smell to the paints.

2 Claims, No Drawings

ADDITIVE-CONTAINING PAINTS

DISCLOSURE

The present invention relates to novel paints showing a lower irritating power on the respiratory and conjunctival mucosae, and improved olfactory characteristics. More precisely, the present invention relates to paints from natural or synthetic material, applicable as solutions to any types of surfaces, to which substances or mixtures of substances have been added, suitable to:

(a) neutralize the irritating effect on the mucosae of the volatile substances contained in the paints, essentially the volatile monomers and the solvents;

(b) prevent the cellular-metabolic damages caused by the volatile components of the paints, as they have been hereinabove defined, on the respiratory and conjunctival mucosae, by increasing the immunologic defenses of the organism itself;

(c) modify the olfactory characteristics of volatile components having an unpleasant smell, so as to obtain end products with a pleasant smell.

The additive-containing paints according to the present invention are essentially pertaining to the following classes:

A-paints on the basis of natural resins, such as shellac or the most soluble varieties of Manilla copals, which are generally applied as solutions in ethyl alcohol, and dried by evaporation of the solvent;

B-paints on the basis of cellulose derivatives, which are generally applied as solutions in blends of volatile solvents, easily removable by evaporation at room temperature, or also by suitable heating. The more largely used cellulose derivatives are nitrocellulose and cellulose esters (acetate, butyrate) and cellulose ethers (e.g., ethylcellulose);

C-paints on the basis of synthetic resins, and essentially polyurethane resins, polyisocyanates and polyisocyanurates, saturated or unsaturated polyesters, polyacrylates, epoxy, ureic and melamine resins, alkyd, ketonic, coumarone, silicone, polyamide resins, polymers and copolymers from unsaturated hydrocarbons. All these resins are applied in the presence of blends of organic solvents and often, in particular in the case of polyester resins, of polyurethane resins and of polyisocyanates, in the presence of monomers or of oligomers crosslinking under the application conditions, remaining incorporated within the same paints. The monomers most commonly used as solvent/crosslinking agents in the paints are styrene, diisocianates, acrylates, epoxides.

From the above, it is clear that the different families of paints, and specifically the single paints, show different problems of toxicity and of intolerability for the user.

Whilst indeed in the case of the paints of groups (A) and (B) and of many paints of group (C) the negative effects for the user are only deriving from the use of volatile solvents, for some paints from group (C) a strong influence is due to the presence in the applied solution of monomer substances, which are not completely fixed by the crosslinking reaction, and are evaporated together with the solvent.

Moreover for all paints the irritating effect for the mucosae is to be taken into account, which is due to the dusts originated by the sanding, and is caused both by mechanical effect, and by the chemical activity of the same dusts.

We have now found, and is the object of the present invention, that definite groups exist of therapeutic substances which, if suitably mixed with the components of the paints before the application thereof, within defined concentration limits, are in no way altering the characteristics thereof, but are vapourized together with the solvents by which the same paints are applied and reach therefore the respiratory and conjunctival mucosae together with them in an amount sufficient to neutralize the noxious effects both of the solvents and of the volatile components of the paints.

Moreover, a limited amount of the therapeutical substance remains incorporated within the paint, so as to neutralize the irritating effects of the dusts originated by the sanding.

As initially said, the therapeutic substances allowing the present invention to be realized may belong to the categories (a) and (b). They have however certain characteristics which are critically common to all useful substances, and precisely: they do not have reactive groups capable of reacting with and hence altering the components of the paints; they do not show side reactions; they are not photosensitive; they are not altered by the components of the paints; they have a high enough vapour pressure in the adopted solvent system, to be vapourized together with said solvents under the conditions of paint application; their concentration in the system must be such that, considering the equilibrium which is established between the liquid phase and the gas phase, into this latter passes an amount of product enought to produce the desired prophylactic or therapeutical effect. In practice, it was very difficult to find out substances in harmony with these requisites and in many cases it was necessary to modify the solvent system of the paint, and the application modalities, in order to achieve the desired effect.

We have found that substances belonging to the (a) group as hereinabove defined, i.e. substances capable of neutralizing the irritative effect of the solvents and of the volatile monomers on the mucosae, which can be used according to the present invention, are: salbutamol, clenbuterol, terbutaline, fenoterol, isoprotenerol, bitolterol, prciprenaline, ephedrine, and in general the derivatives of phenylethanolamines with therapeutical activity; theophylline and its derivatives, tretoquinol, ketotifen, guaiacol, ethylorthoformate, sobrerol, bromhexine and derivatives thereof, thiroproline, acetylcysteine and derivatives thereof, procaterol and terpenic active principles such as: verbenone, verbenol, myrtenol, myrtenal, trans-pinocarveol, cis-pinelol, thymol, eucalyptol, menthol, pine essential oil, niaouli essential oil, cajeputi oil.

Substances belonging to the group (b) as hereinabove defined, i.e. substances capable of increasing the immunologic defences of the organism, when they are brought into contact with the mucosae, which can be used according to the present invention,are e.g.: cromoglycic acid and its derivatives, oxatomide, astemizole, fenspiride, beclomethasone, and lodoxamide.

Substances which are on the contrary belonging to the group (c) as hereinabove defined, i.e., substances suitable to modify the olfactory characteristics of the paints, which can be used according to the present invention, are the terpenic substances of alcoholic or phenolic character, such as e.g. terpineol, linalol, eugenol, iso-eugenol, benzyl-iso-eugenol, geraniol, rhodinol, borneol, tetrahydrolinalol, citronellol, nerol, carvol, farnesol, safrole, thymol and anethole.

In association with the aromatic and aromatizing substances, it is generally necessary to use fixative agents, i.e., products capable of modifying the vapour pressure of the terpenes and hence dilute the elimination thereof over a longer time interval.

As fixative agents, we may mention as examples vanillin, coumarin, and heliotropin.

The terpenic substances, or the system of terpenic substances capable of modifying the olfactory characteristics of the paints, must be defined everytime with reference to well-defined products, according to the additive-containing paint and hence to the particular olfactory problems presented by it.

As a general, rule, it is however preferable to use a "system" of terpenes, within which the concentration of each component may range within broad limits, generally comprised between 0 to 50% of total mixture.

Also the fixative agents are preferably used as combinations, rather that as single products, the total amount thereof representing generally from 1 to 10% of used terpenes. The compounds of groups (a), (b) and (c) as hereinabove defined, may be used with any types of paints belonging to classes A, B and C. The compounds (a) and (b) are generally used alternatively, whilst the compounds (c) are intended as being always used in combination with at least a compound selected from classes (a) and (b).

In particular, we have found that the use of terpenes is compatible with the use of prophylactic and therapeutic substances as defined hereinabove, considering that in case of simultaneous uses of the two types of products, to the many requisites required for the therapeutic agents, also the chemical inertness thereof towards the terpenes is to be added.

Moreover, as already mentioned, in many cases it is necessary to modify the solvent system normally employed. In fact, it resulted particularly difficult to identify a combination of solvents capable of acting both as vehicle for the components of the paint, and as vehicle for the therapeutic substance, maintaining unchanged the technological-applicative characteristics of the same paints.

The novel additive-containing paints according to the present invention may contain, besides the already mentioned substances, also other additives conferring a pleasant smell to the paints, or different additives. The amount of compounds with prophylactic or therapeutic action to be used in the paints according to the present invention, may range within broad limits, depending on the activity of the compound used, on the characteristics of the polymers constituting the film-forming agent of the paints and on the solvents used for the application of the same paints, solvents which after all are the "vehicle" of the therapeutic substances which are brougth into contact with the mucosae.

As for the terpenic compounds and fixative agents, the amount thereof is adjusted on the basis of the composition of the paint, and in particular on the basis of the composition of the volatile portion. The therapeutic additives and the terpenic compounds can be uniformly incorporated into the paints both by preparing partial pre-blends which are then mixed into end products, before the application, and by uniformly incorporating them into the paints immediately before the application.

To the purpose of illustrating the invention more clearly without however limiting it, we report hereinunder some examples of specific embodiments thereof.

EXAMPLES 1–4

Preparation of polyurethane paints

|  | Opaque 1 | Opaque 2 | Primer | Sealer |
|---|---|---|---|---|
| Part A |  |  |  |  |
| Alkyd resin (60% in xylene) | 50 | 60 | 60 | — |
| Saturated polyester resin (100%) | — | — | — | 25 |
| Toluene | 10 | 11 | 15 | 25 |
| Ethyl acetate | 22 | 13 | 10 | 30 |
| Butyl acetate | 16 | 11 | 13 | 15 |
| Ethyleneglycol mono-ether acetate | — | 3 | — | 5 |
| Silica | 2 | 2 | — | — |
| Zinc stearate | — | — | 2 | — |
| Part B |  |  |  |  |
| Polyisocyanate (75% in ethyl acetate) | 15 | 15 | — | 35 |
| Polyisocyanate (50% in butyl acetate) | 10 | 15 | 25 | — |
| Butyl acetate | 20 | 15 | 20 | 10 |
| Ethyleneglycol mono-ether acetate | 5 | 5 | 5 | 5 |
| Additive DH$_1$ | 0.2 | 0.2 | 0.2 | 0.2 |
| Ethyl cromoglycate | 0.01% | 0.01% | 0.01% | 0.01% |

The additive DH$_1$ is a mixture of terpenses in the following proportions:

| alpha-terpineol | 15% |
|---|---|
| linalol | 15% |
| eugenol | 32% |
| isoeugenol | 24% |
| geraniol | 5% |
| borneol | 3% |
| heliotropin | 3% |
| coumarin | 3% |

Percentages are by weight.

To the same paints instead of ethyl cromoglycate a corresponding percentage (0.01%) of salbutamol, ephedrine, terbutaline, ethylorthoformate has been added, in any case obtaining equivalent results, in the tests indicated hereinunder.

EXAMPLE 5

Preparation of polyester paint

| Unsaturated polyester paint (67% in styrene) | 83 |
|---|---|
| Monomer styrene | 16.9 |
| Paraffin (m.p. 48–58° C.) | 0.1 |
| Additive DH$_2$ | 0.2 |
| Ketotifen | 0.01% |

The additive DH$_2$ is a mixture of terpense in the following proportions:

| farnesol | 15% |
|---|---|
| Tetrahydrolinalol | 30% |
| safrole | 20% |
| citronellol | 20% |
| thymol | 2% |
| anethole | 5% |
| carvol | 5% |
| heliotropin | 2% |

| -continued | |
|---|---|
| coumarin | 1% |

Paints of equivalent composition have been prepared by replacing ketotifen with the same amount of astemizole, fenopirid, oxatomide, in each case obtaining equivalent results from the viewpoint of the protection from the inflammatory action of the paints, and from the olfactory viewpoint.

All the paints prepared as hereinable shown, have been supplied to skilled users, who have attended to the application thereof for periods ranging from 7 to 30 days. In all cases it has been objectively found that the operating conditions were extremely more comfortable than normally, thanks to the absences of irritation of the eyes and of the respiratory ways and due to the absence of unpleasant smell which often, besides indicating the presence of pollutants, creates in the user of notable discomfort of psychologic character.

The series of tests which have been carried out allows it to be stated that by means of the novel paints it is possible to create working conditions more comfortable and less dangerous to the user, thus drastically reducting the incidence of professional diseases and improving the yield.

It is moreover clear that the absence of the well-known unpleasant paint smell, persisting within home or working rooms for a long time, is already per se a great advantage and a noticeable technical improvement in the field.

We claim:

1. Paint containing additives having a therapeutic or a prophylactic action which neutralize or prevent the irritating effect of volatile components in the paint on respiratory and conjunctival mucosae of an organism, said additives comprising:

A. one or more terpenic substances of alcoholic or phenolic character, capable of modifying the olfactory characteristics of the paint, said terpenic substance being selected from the group consisting of terpineol, linalol, eugenol, isoeugenol, benzylisoeugenol, geraniol, rhodinol, borneol, tetrahydrolinalol, citronellol, nerol, carvol, farnesol, safrole, thymol and anethole, and being present in the paint in an amount of 0.2% by weight;

and at least one therapeutic or prophylactic substance selected from the group consisting of B. a therapeutic substance capable of neutralizing the irritating effect of the volatile components of the paint, said substance being selected from the group consisting of salbutamol, clenbuterol, terbutaline, fenoterol, isoprotenerol, bitolterol, orciprenaline, ephedrine, theophylline, tretoquinol, ketotifen, guaiacol, sobrerol, ethylorthoformate, bromhexine, thioproline, acetylcysteine and procaterol; and C. a prophylactic substance capable of increasing the immunologic defenses of the organism when said substance is brought into contact with its respiratory and conjunctival mucosae, said substance being selected from the group consisting of cromoglycic acid, oxatomide, astemizole, fenspiride, beclomethasone and lodoxamide, said therapeutic and/or prophylactic substances of type B and C being present in the paint in amount of 0.01% by weight.

2. The paint containing additives according to claim 1, wherein the terpenic substances are used in combination with a fixative agent selected from the group consisting of vanillin, coumarin and heliotropin, said fixative agent being present in an amount comprising between 1% and 10% by weight of the terpenic substance.

* * * * *